United States Patent Office 3,825,574
Patented July 23, 1974

3,825,574
PROCESS FOR PREPARING SUBSTITUTED CHROMONE-3-CARBONITRILES, CARBOX-AMIDES AND CARBOXYLIC ACIDS
Richard E. Brown, Hanover, N.J., assignor to Warner-Lambert Company, Morris Plains, N.J.
No Drawing. Filed Dec. 4, 1972, Ser. No. 311,586
Int. Cl. C07d 7/34
U.S. Cl. 260—345.2
6 Claims

ABSTRACT OF THE DISCLOSURE

This invention relates to a novel process for preparing chromones of the formula I:

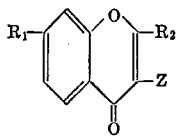

wherein $R_1$ represents hydroxy, lower alkoxy, or acyloxy; $R_2$ represents hydrogen, lower alkyl, fluorinated lower alkyl, alkoxycarbonyl, carboxy, or lower alkyl carboxylic acid; Z represents cyano, carbamoyl, or carboxy; and $R_2$ and Z together form a substituted pyrrole ring, by treating a substituted benzoylacetonitrile of the formula II:

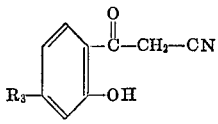

wherein $R_3$ represents hydroxy or lower alkoxy, with an acid derivative having the formula III, IV, or V:

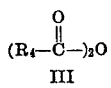 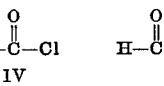 
III         IV         V wherein $R_4$ represents lower alkyl, fluorinated lower alkyl, alkoxycarbonyl or, together with the

of formula III, forms an up to 5 carbon atom cyclic anhydride, in the presence of a base, to effect acylation and ring closure, and obtain a substituted 3-cyanochromone derivative which may be hydrolyzed with a mineral acid to provide the corresponding substituted chromone-3-carboxamide or the corresponding substituted chromone-3-carboxylic acid. The compounds prepared by the process of this invention are useful as anti-allergic agents.

The present invention is concerned with the preparation of substituted chromone-3-carbonitriles, carboxamides and carboxylic acids having the general formula I:

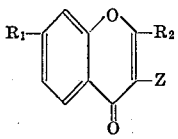

wherein $R_1$ represents hydroxy, lower alkoxy, or acyloxy; $R_2$ represents hydrogen, lower alkyl, fluorinated lower alkyl, carbalkoxy, carboxy or lower alkyl carboxylic acid; Z represents cyano, carbamoyl, or carboxy, with the proviso that when $R_2$ represents hydrogen, Z represents cyano or carbamoyl; and $R_2$ and Z may together form a substituted pyrrole ring. The compounds having formula I produced by the process of this invention form the basis for co-pending U.S. application Ser. No. 312,154, filed Dec. 4, 1972. These compounds are active in the prevention of allergic and asthmatic reactions in mammals. For example, in tests conducted by the procedures described in I. Mota, *Life Sciences*, 7, 465 (1963) and Z. Ovary et al., *Proc. Soc. Exptl. Biol. Med.*, 81, 584 (1952), these compounds are capable of protecting rats from allergic and asthmatic reactions at a dose level of 5–100 mg./kg., when administered parenterally or orally.

In use, the compounds prepared by the novel process of this invention may be combined with a parenterally acceptable vehicle such as a gum tragacanth saline suspension to provide dosage forms suitable for parenteral administration; or they may be combined with pharmaceutical diluents such as lactose, cornstarch, microcrystalline cellulose. Polyethylene Glycol 4,000 and/or 6,000, and the like, and formulated into tablet or capsule dosage forms. A dose of 5 to 100 mg./kg. of body weight is suggested for relieving allergic conditions. This dosage regimen may be varied depending upon the severity of the condition, the age, weight, and sex of the mammal being treated and the route of administration.

For treating human beings, a dose of 20 to 50 mg. administered orally or by inhalation in the form of an aerosol spray, is prescribed to give symptomatic relief of asthma. The therapeutic spectrum of the compounds of this invention may be broadened by combination with sympathomimetic agents such as isoproterenol or with steroids such as cortisone or its derivatives.

In addition to the above pharmaceutical activities, certain compounds prepared by the novel process of this invention also exhibit anti-secretory effects and gastric anti-ulcer activity in experimental mammals such as rats. Compounds demonstrating this last mentioned activity include those compounds of the general formula I above wherein $R_1$ represents lower alkoxy, hydroxy, or acyloxy; $R_2$ represents hydrogen, lower alkyl, trifluoromethyl, alkoxycarbonyl; carboxy or lower alkyl carboxylic acid; and Z represents cyano. When these 3-cyano derivatives are tested according to the procedure described in Shay, H. et al., *Gastroenterology*, 5, 43 (1945) in the pylorus ligated rat, that exhibit an $ED_{50}$ of 20 mg. of 50 mg./kg. of body weight.

The novel process of this invention uses, as the starting material, mono- or di-substituted o-hydroxybenzoyl acetonitriles. The starting substituted orthohydroxybenzoyl acetonitriles having the general formula II:

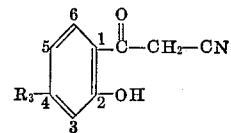

wherein $R_3$ is hydroxy or lower alkoxy are easily prepared by known methods or obvious adaptations thereof, as described in *Chem. Ber.*, 50, 1292–1305 (1917). Representative starting materials prepared in the aforementioned manner which can be used in the novel process of this invention include:

2,4-dihydroxybenzoyl acetonitrile
2-hydroxy-4-methoxybenzoyl acetonitrile
2-hydroxy-4-ethoxybenzoyl acetonitrile
2-hydroxy-4-propoxybenzoyl acetonitrile.

According to the novel process of this invention, o-hydroxybenzoyl acetonitriles having the general formula II above are reacted with an acid derivative having the formula III, IV, or V:

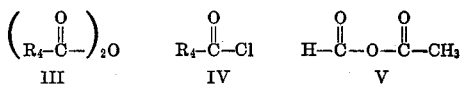
III         IV         V wherein $R_4$ represents lower alkyl, fluorinated lower alkyl, carbalkoxy, or, together with the

of formula III, forms an up to 5 carbon atom cyclic anhydride, in the presence of a base such as triethylamine, an alkali metal hydride, alkoxide, or hydroxide, or preferably, pyridine. Acylation and subsequent ring closure take place to afford a chromone nitrile of formula VI, wherein $R_1$ and $R_2$ have the meanings described above for formula I:

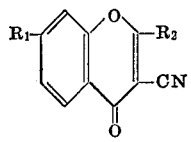

One of the especially preferred features of the novel process of this invention is the facility with which chromone derivatives having a substituent in the 2-position are prepared, i.e., through the use of the acid reactant III or IV above. Suitable acid reactants include acetic anhydride, acetylchloride, succinic anhydride, trifluoroacetic anhydride or ethyl oxalyl chloride.

In order to prepare compounds according to structure VI in which $R_2$ represents hydrogen, the acid derivative used is the acetic formic anhydride of formula V, above. The phenolic oxygen in position 7 is also acylated under these conditions and may be isolated as such, or the acyl group may be hydrolyzed during workup. In the former case, treatment with a mild base regenerates the phenol.

In the second step of the novel process of this invention, compounds having the formula VI above are hydrolyzed with a mineral acid to the corresponding amides; using slightly more rigorous reaction conditions, i.e.; higher temperatures and longer reaction time, one obtains the corresponding acid derivative. Suitable mineral acids which may be used for the hydrolysis reaction include hydrochloric, sulfuric, phosphoric and the like.

In the case where $R_2$ represents ethoxycarbonyl and Z represents carbamoyl, further refluxing with acid promotes ring closure and the formation of a substituted-pyrrole ring, i.e. a dioxo-substituted pyrrole ring.

Thus, there are obtained, according to the above-described novel process, compounds of the formula I:

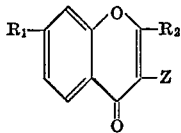

wherein $R_1$, $R_2$, and Z have the above-described meanings.

A preferred group of compounds which may be prepared according to the novel process of this invention are those having the general formula I above in which $R_1$ represents hydroxy or acetoxy; $R_2$ represents hydrogen, lower alkyl, trifluoromethyl, alkoxycarbonyl, carboxy or lower carboxylic acid; Z represents cyano or carbamoyl; and $R_2$ and Z may together form a dioxo-substituted pyrrole ring.

A particularly preferred group of compounds which may be prepared according to the process of this invention are those having the formula I above in which $R_1$ represents hydroxy, or acetoxy; $R_2$ represents methyl, trifluoromethyl, ethoxycarbonyl, or propionic acid; Z represents cyano, carbamoyl, or carboxy; and $R_2$ and Z together form a dioxo-substituted pyrrole ring.

In all of the above formulas, definitions for $R_1$, $R_2$, $R_3$, $R_4$, and Z are based on the following meanings: the term "lower alkyl" and the alkyl portion of "lower alkoxy" are meant to include lower aliphatic hydrocarbons having from 1 to 7 carbon atoms in the carbon chain, preferably 1 to 4 carbon atoms, such as methyl, ethyl, propyl, isopropyl, butyl, or isobutyl.

The term "acyloxy" is meant to include lower alkyl carboxylic acids wherein "lower alkyl" has the above described meaning. Similarly in the term "alkoxycarbonyl" the alkoxy moiety is meant to include lower aliphatic hydrocarbon groups of 1 to 7 carbon atoms, preferably 1 to 4 carbon atoms, as described above.

The term "lower carboxylic acid" is meant to include carboxylic acids in which the aliphatic hydrocarbon chain contains from 1 to 4 carbon atoms.

The term "fluorinated lower alkyl" is meant to include lower alkyl groups as described above wherein one or more hydrogen atoms have been replaced by fluorine.

The following examples are provided to further illustrate our invention:

EXAMPLE 1

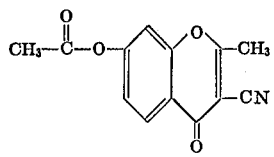

7-acetoxy - 4 - oxo-2-methyl-4H-1-benzopyran-3-carbonitrile.—A mixture of 5 g. of 2,4-dihydroxybenzoyl acetonitrile, 15 ml. of pyridine and 7.5 ml. of acetic anhydride was left overnight at room temperature. The next morning the crystals were filtered and recrystallized from ethanol, m.p. 140–141° C.

Anal.—Calcd. for $C_{13}H_9NO_4$: C, 64.20; H, 3.73; N, 5.76. Found: C, 64.07; H, 3.73; N, 5.76.

EXAMPLE 2

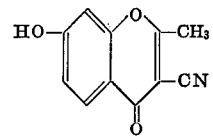

7-hydroxy - 4 - oxo - 2 - methyl - 4H - 1-benzopyran-3-carbonitrile.—A slurry of 7.3 g. of 7-acetoxy-4-oxo-2-methyl-4H-1-benzopyran-3-carbonitrile in 45 ml. of methanol was treated with 75 ml. of 1N sodium hydroxide solution. The mixture was stirred for 5 minutes, cooled in ice and acidified with 4N HCl. The solid was filtered and recrystallized from methanol m.p. >300° C.

Anal.—Calcd. for $C_{11}H_7NO_3$: C, 65.67; H, 3.51; N, 6.96. Found: C, 65.56; H, 3.46; N, 6.89.

EXAMPLE 3

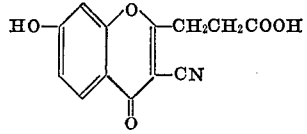

3-cyano - 7 - hydroxy-4-oxo-4H-1-benzopyran-2-propionic acid.—A mixture of 8.85 g. of 2,4-dihydroxybenzoyl acetonitrile, 25 ml. of pyridine and 15 g. of succinic anhydride was stirred at room temperature overnight. The next morning the solid was filtered and recrystallized from methanol, m.p. 300–301° C.

Anal.—Calcd. for $C_{13}H_9NO_5$: C, 60.24; H, 3.50; N, 5.40. Found: C, 59.96; H, 3.46; N, 5.25.

EXAMPLE 4

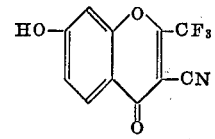

7 - hydroxy - 4 - oxo-2-(trifluoromethyl)-4H-1-benzopyran-3-carbonitrile.—A slurry of 8.85 g. of 2,4-dihydroxybenzoyl acetonitrile in 40 ml. of trifluoroacetic anhydride was cooled to 0° C. and treated dropwise with 7 ml. of pyridine. The resulting yellow solution was set aside at room temperature for 6 days. The reaction mixture was concentrated to a paste, water and ice were added, and the solid product filtered. Recrystallization from acetonitrile gave the analytical sample, m.p. 255–257° C.

Anal.—Calcd. for $C_{11}H_4NO_3F_3$: C, 51.78; H, 1.58; N, 5.49. Found: C, 51.82; H, 1.66; N, 5.92.

EXAMPLE 5

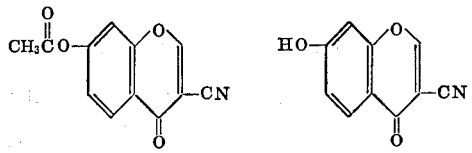

7 - hydroxy - 4 - oxo-4H-1-benzopyran-3-carbonitrile acetate and 7 - hydroxy-4H-oxo-4H-1-benzopyran-3-carbonitrile.—To a mixture of 105 g. (1.2 mol) of formyl acetic anhydride and 40 ml. of pyridine cooled to −10° C. was added 16.5 g. (0.1 mol) of 2,4-dihydroxybenzoylacetonitrile. This mixture was stirred overnight, allowing the reaction to warm to room temperature. The mixture was evaporated in vacuo and the residue was triturated with ethanol and filtered to give 23.3 g. of crude material. Recrystallization of this solid from absolute ethanol gave 5.3 g. of 7-hydroxy-4-oxo-4H-1-benzopyran-3-carbonitrile acetate, m.p. 178–180° C.

Anal.—Calcd. $C_{12}H_7O_4N$: C, 62.89; H, 3.08; N, 6.11. Found: C, 63.18; H, 3.25; N, 6.22.

The ethanolic filtrate from the recrystallization was evaporated and the residue was dissolved in dil. ammonium hydroxide soln. This was then acidified with 2N hydrochloric acid to give 7-hydroxy-4-oxo-4H-1-benzopyran-3-carbonitrile, m.p. 292–293° C.

Anal.—Calcd. for $C_{10}H_5O_3N$: C, 64.17; H, 2.69; N, 7.48. Found: C, 64.19; H, 2.86; N, 7.46.

EXAMPLE 6

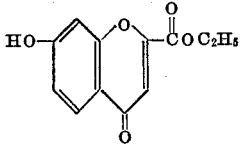

Ethyl 3-cyano-7-hydroxy-4-oxo-4H-1-benzopyran-2-carboxylate.—A mixture of 12.82 g. (0.08 mol) of 2,4-dihydroxybenzoylacetonitrile, 32.8 g. (0.24 mol) of ethyl oxalyl chloride and 120 ml. of pyridine was stirred overnight. The mixture was filtered, the cake was discarded, and the filtrate evaporated in vacuo to give a dark brown oil. This was slowly poured into cold 2N HCl. The solid was filtered and recrystallized from ethanol gave 13.7 g. (66%) of cream colored plates, m.p. 262–264° C.

Anal.—Calcd. for $C_{13}H_9O_5N$: C, 60.24; H, 3.50; N, 5.40. Found: C, 60.48; H, 3.52; N, 5.36.

EXAMPLE 7

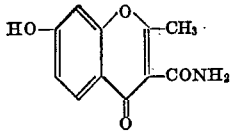

7 - hydroxy - 4 - oxo-2-methyl-4H-1-benzopyran-3-carboxamide.—A slurry of 1 g. of 7-hydroxy-4-oxo-2-methyl-4H-1-benzopyran-3-carbonitrile in 6 ml. of conc. sulfuric acid was heated for 3 hours on the steam bath. The mixture was poured onto ice. The solid was filtered and recrystallized from ethanol, m.p. 289–290° C.

Anal.—Calcd. for $C_{11}H_9NO_4$: C, 60.27; H, 4.14; N, 6.39. Found: C, 60.17; H, 4.12; N, 5.90.

EXAMPLE 8

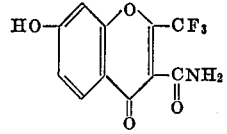

7 - hydroxy - 4 - oxo-2-(trifluoromethyl)-4H-1-benzopyran-3-carboxamide.—A mixture of 3 g. of 7-hydroxy-4-oxo - 2 - (trifluoromethyl)-4H-1-benzopyran-3-carbonitrile, 4 ml. of conc. sulfuric acid and 1 ml. of water was heated for 1½ hours at an internal temperature of 120–135° C. The clear dark solution was poured onto ice. The solid was filtered and recrystallized from methanol, m.p. >310° C.

Anal.—Calcd. for $C_{11}H_6NO_4F_3$: C, 48.37; H, 2.21; N, 5.13. Found: C, 48.41; H, 2.21; N, 4.99.

EXAMPLE 9

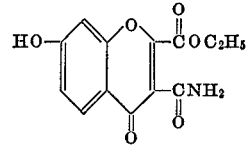

Ethyl 3-carbamoyl-7-hydroxy - 4 - oxo-4H-1-benzopyran-2-carboxylate.—A mixture of 25.0 g. (0.097 mol) of ethyl 3 - cyano-7-hydroxy - 4 - oxo-4H-1-benzopyran-2-carboxylate in 230 ml. conc. sulfuric acid was stirred at room temperature overnight. The mixture was then poured into 1.5 l. of ice water with stirring. The resulting solid was filtered off, washed with water, and dried. 16.5 g. (60%), m.p. >320° C. from acetonitrile.

Anal.—Calcd. for $C_{13}H_{11}O_6N$: C, 56.32; H, 4.00; N, 5.05. Found: C, 56.20; H, 4.08; N, 5.32.

EXAMPLE 10

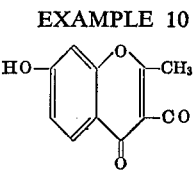

7-hydroxy - 2 - methyl-4-oxo-4H-1-benzopyran-3-carboxylic acid.—A mixture of 5.2 g. of 7-hydroxy-4-oxo-2-methyl-4H-1-benzopyran-3-carbonitrile, 20 ml. of conc. sulfuric acid and 5 ml. of water was heated for 5 hours at an internal temperature of 130°. The mixture was poured onto ice. The solid was filtered and recrystallized from ethanol, m.p. 286–287° C.

Anal.—Calcd. for $C_{11}H_8O_5$: C, 60.00; H, 3.66. Found: C, 59.93; H, 3.55.

EXAMPLE 11

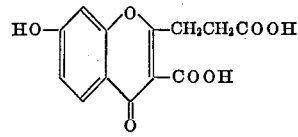

3-carboxy - 7 - hydroxy-4-oxo-4H-1-benzopyran-2-propionic acid.—Prepared from 3 - cyano-7-hydroxy-4-oxo-4H-1-benzopyran-2-propionic acid as described in Experimental 10. The product was recrystallized from ethanol, m.p. 218–219° C.

Anal.—Calcd. for $C_{13}H_{10}O_7$: C, 56.12; H, 3.62. Found: C, 55.69; H, 3.70.

EXAMPLE 12

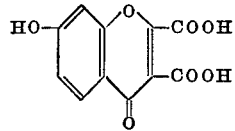

7-hydroxy - 4 - oxo-4H-1-benzopyran-2,3-dicarboxylic acid.—A mixture of 2.0 g. (7.2 mmol) of ethyl 3-carbamoyl-7 - hydroxy-4-oxo-4H-1-benzopyran-2-carboxylate in 10 ml. of 80% sulfuric acid was heated over a steam bath for 1 hr. and then poured into 50 ml. of water. This was filtered and the filtrate evaporated *in vacuo*. The gummy residue was triturated with a minimum amount of water, the solid filtered and dried, m.p. 255–257° C.

*Anal.*—Calcd. for $C_{11}H_6O_7$: C, 52.81; H, 2.42. Found: C, 52.89; H, 2.87.

EXAMPLE 13

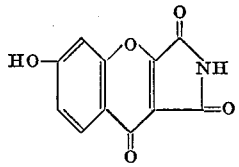

3,4-dihydro - 7 - hydroxy-4H-pyrrolo[3,4-b][1]benzopyran-1,3,4(2H)-trione.—A mixture of 3.5 g. (0.013 mol) of ethyl 3-carbamoyl-7-hydroxy-4-oxo-4H-1-benzopyran-2-carboxylate in 100 ml. of glacial acetic acid was refluxed for 3 hrs. The solid was filtered and recrystallized from aqueous dimethylformamide, m.p. >300° C.

*Analysis.*—Calcd. for $C_{11}H_5O_5N$: C, 57.15; H, 2.18; N, 6.06. Found: C, 56.89; H, 2.32; N, 5.93.

I claim:
1. A process for the production of a compound of the formula I:

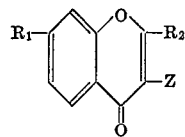

wherein $R_1$ represents hydroxy, lower alkoxy, or lower alkanoyloxy; $R_2$ represents hydrogen, lower alkyl, fluorinated lower alkyl, lower alkoxycarbonyl, carboxy, or lower alkyl carboxylic acid; Z represents cyano, carbamoyl, or carboxy; and $R_2$ and Z may together form a dioxo-substituted pyrrole ring, which comprises:

(A) treating a substituted benzoyl acetonitrile of the formula II:

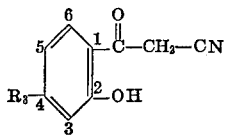

wherein $R_3$ represents hydroxy or lower alkoxy, with an acid derivative having the formula III, IV, or V:

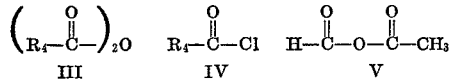

wherein $R_4$ represents lower alkyl, fluorinated lower alkyl, alkoxycarbonyl or, together with the

of formula III, forms an up to 5 carbon atom cyclic anhydride, in the presence of a base, to effect acylation and ring closure, resulting in a compound of the formula VI:

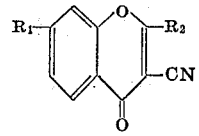

wherein $R_1$ and $R_2$ are as described for formula I above;

(B) hydrolyzing compound VI with a mineral acid to obtain the corresponding acid amide according to formula I, where Z represents carbamoyl or the corresponding free acid according to formula I, wherein Z represents carboxy; and (C) additionally heating a compound having formula I wherein $R_1$ represents hydroxy, lower alkoxy, or lower alkanoyloxy; $R_2$ represents lower alkoxycarbonyl, and Z represents carbamoyl, with acetic acid to obtain a compound wherein $R_2$ and Z together form a dioxo-substituted pyrrole ring.

2. A process according to Claim 1 wherein, in Step (A), the acid derivative has the formula

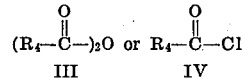

and wherein, in the resulting compound of the formula VI, $R_2$ represents lower alkyl, fluorinated lower alkyl, lower alkoxycarbonyl, carboxy or lower alkyl carboxylic acid.

3. A process according to Claim 2 wherein the acylation and ring closure of Step (A) is effected by using, as the acid derivative, acetic anhydride, aceticformic anhydride, acetylchloride, succinic anhydride, trifluoroacetic anhydride or ethyl oxalyl chloride.

4. A process according to Claim 2 wherein the base of Step (A) is triethylamine, an alkali metal hydride, an alkoxide, a hydroxide, or pyridine.

5. A process according to Claim 2 wherein the mineral acid of Step (B) is hydrochloric acid, sulfuric acid or phosphoric acid.

6. A process according to Claim 2 wherein the base of Step (A) is pyridine and the acid of Step (B) is sulfuric acid.

References Cited

UNITED STATES PATENTS 3,046,275   7/1962   Kohlstaedt _____ 260—345.2

FOREIGN PATENTS 769,146   6/1971   Belgium.

OTHER REFERENCES

Jones et al.: *J. Chem. Soc.*, pp. 562–69 (1949).

JOHN M. FORD, Primary Examiner

U.S. Cl. X.R.

260—326.29, 326.5 B; 424—279, 274